US011971666B2

(12) United States Patent
Katagiri et al.

(10) Patent No.: US 11,971,666 B2
(45) Date of Patent: Apr. 30, 2024

(54) IMAGE FORMING APPARATUS AND CONTROL METHOD, THAT CONTROL CHARGING VOLTAGE ACCORDING TO POSITIONS OF DEVELOPING ROLLER

(71) Applicant: CANON KABUSHIKI KAISHA, Tokyo (JP)

(72) Inventors: Hiroko Katagiri, Tokyo (JP); Shinji Katagiri, Kanagawa (JP); Koji An, Saitama (JP); Takashi Mukai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/728,152

(22) Filed: Apr. 25, 2022

(65) Prior Publication Data

US 2022/0350272 A1 Nov. 3, 2022

(30) Foreign Application Priority Data

Apr. 30, 2021 (JP) ................................ 2021-077158

(51) Int. Cl.
*G03G 15/02* (2006.01)

(52) U.S. Cl.
CPC ................................ *G03G 15/0266* (2013.01)

(58) Field of Classification Search
CPC ........... G03G 15/0266; G03G 15/1675; G03G 21/08; G03G 21/0064
See application file for complete search history.

(56) References Cited

U.S. PATENT DOCUMENTS 10,712,698 B2 7/2020 Mukai et al.
2018/0113397 A1* 4/2018 Ozeki .................... G03G 15/50

FOREIGN PATENT DOCUMENTS

JP H1063027 A 3/1998
JP H1115189 A 1/1999
JP 2004191766 A 7/2004
JP 2019164229 A 9/2019

* cited by examiner

*Primary Examiner* — Arlene Heredia
(74) *Attorney, Agent, or Firm* — ROSSI, KIMMS & McDOWELL LLP

(57) ABSTRACT

An image forming operation forms an image on a transfer target in a state in which a developing member is located at a first position where a developer is supplied to an image bearing member and a first charging voltage is applied to a charging unit. The image forming operation is followed by: a first rotating operation of rotating the image bearing member in a state in which the developing member is located at the first position and a second charging voltage smaller in absolute value than the first charging voltage is applied; and a second rotating operation of rotating the image bearing member in a state in which the developing member is located at a second position where the developer is not supplied to the image bearing member and a third charging voltage smaller in absolute value than the second charging voltage is applied.

19 Claims, 8 Drawing Sheets

IMAGE FORMING APPARATUS AND CONTROL METHOD, THAT CONTROL CHARGING VOLTAGE ACCORDING TO POSITIONS OF DEVELOPING ROLLER

BACKGROUND OF THE INVENTION

Field of the Invention

The present invention relates to an image forming apparatus and a control method of the same.

Description of the Related Art

In an image forming apparatus that uses an electrophotographic process to perform image formation, a toner image formed on a surface of a photosensitive drum is electrostatically transferred to an intermediate transfer target or a recording material by a voltage applied to a transfer target disposed opposite the photosensitive drum. In the case of forming a multi-color toner image, the transfer process is repeatedly performed for the toner images of respective colors. Image formation on a recording material is achieved by fixing the toner image on the recording material in a fixing unit. Japanese Patent Application Publication No. H10-63027 describes a technique for improving transfer efficiency by reducing the adhesion of the toner on the photosensitive drum with fine particles adhered in advance to the surface of the photosensitive drum so that there are fine particles intervening between the photosensitive drum and the toner image.

SUMMARY OF THE INVENTION

According to the technique described in Japanese Patent Application Publication No. H10-63027, fine particles that assist transfer (hereinafter referred to as carriers) are added to the toner in advance. The carriers are then separated from the toner and adhered on the photosensitive drum, so that the carriers are present on the photosensitive drum. Sometimes, toner that failed to be transferred in the transfer process and remained on the photosensitive drum (hereinafter, untransferred toner) electrically adheres to the charging roller when passing through a section where the toner comes into contact with the charging roller because of the influence of an electric field between the charging roller and the photosensitive drum. A cleaning process can be performed to the charging roller by forming an electric field in the opposite direction from that during image formation between the charging roller and the photosensitive drum to cause the toner that has adhered to the charging roller to move to the photosensitive drum.

When the carriers are unevenly distributed on the photosensitive drum, the charge performance differs between portions with more carriers and less carriers, which causes non-uniformity in surface potential of the photosensitive drum. In this case, the non-uniformity in the electric field between the charging roller and the photosensitive drum causes uneven transfer of toner from the charging roller to the photosensitive drum. This means that the toner that has adhered to the charging roller cannot be cleaned off uniformly even though a cleaning process is performed, because of which there was sometimes a case where density non-uniformity occurred in the succeeding image formation.

An object of the present invention is to enable efficient cleaning of a charging unit for charging an image bearing member in an image forming apparatus in which an electrostatic latent image formed on the image bearing member is developed using a developer containing toner and carriers, to remove the toner that has adhered to the charging unit.

An image forming apparatus according to the present invention includes:

- an image bearing member;
- a charging unit configured to charge the image bearing member;
- an exposure unit configured to expose the image bearing member charged by the charging unit to form an electrostatic latent image;
- a developing member configured to form a developer image on a surface of the image bearing member by supplying thereto a developer containing toner and carriers at a developing position facing the image bearing member, the developing member being configured to move between a first position where the developer is to be supplied to the surface of the image bearing member and a second position where the developer is not to be supplied to the surface of the image bearing member;
- a transfer unit configured to transfer the developer image to a transfer target;
- a charging voltage application unit configured to apply a charging voltage to the charging unit; and
- a controller controlling the charging voltage application unit, wherein
- the controller is configured to execute:
  - an image forming operation of forming an image on the transfer target in a state in which the developing member is located at the first position and a first charging voltage is applied,
  - a first rotating operation of rotating the image bearing member in a state in which the developing member is located at the first position and a second charging voltage smaller in absolute value than the first charging voltage is applied, and
  - a second rotating operation of rotating the image bearing member in a state in which the developing member is located at the second position and a third charging voltage smaller in absolute value than the second charging voltage is applied, and
- the controller is configured to execute control such that the first rotating operation and the second rotating operation are performed after the image forming operation.

An image forming apparatus according to the present invention includes:

- an image bearing member;
- a charging unit configured to charge the image bearing member;
- an exposure unit configured to expose the image bearing member charged by the charging unit to form an electrostatic latent image;
- a developing member configured to form a developer image on a surface of the image bearing member by supplying thereto a developer containing toner and carriers and charged with a normal polarity at a developing position facing the image bearing member, the developing member being configured to move between a first position where the developer is to be supplied to the surface of the image bearing member and a second position where the developer is not to be supplied to the surface of the image bearing member;
- a supply member configured to supply the developer to a surface of the developing member;

a transfer unit configured to transfer the developer image to a transfer target;
a developing voltage application unit configured to apply a developing voltage to the developing member;
a supply voltage application unit configured to apply a supply voltage to the supply member; and
a controller configured to execute control, by controlling at least one of the developing voltage application unit and the supply voltage application unit, to create between the developing member and the supply member a potential difference that causes an electrostatic force in a direction from the supply member to the developing member to act on the developer that is charged with the normal polarity, wherein
the controller is configured to execute:
an image forming operation of forming an image on the transfer target in a state in which the developing member is located at the first position and a first potential difference is created between the developing member and the supply member,
a first rotating operation of rotating the image bearing member in a state in which the developing member is located at the first position and a second potential difference that is smaller than the first potential difference is created between the developing member and the supply member, and
a second rotating operation of rotating the image bearing member in a state in which the developing member is located at the second position, and
the controller is configured to execute control such that the first rotating operation and the second rotating operation are performed after the image forming operation.

A method of controlling an image forming apparatus according to the present invention includes the steps of:
forming an electrostatic latent image on an image bearing member charged by a charging unit;
moving a developing member, which is configured to form a developer image on a surface of the image bearing member by supplying thereto a developer containing toner and carriers at a developing position facing the image bearing member, between a first position where the developer is to be supplied to the surface of the image bearing member and a second position where the developer is not to be supplied to the surface of the image bearing member;
transferring the developer image to a transfer target;
executing an image forming operation of forming an image on the transfer target in a state in which the developing member is located at the first position and a first charging voltage is applied to the charging unit;
executing a first rotating operation of rotating the image bearing member in a state in which the developing member is located at the first position and a second charging voltage smaller in absolute value than the first charging voltage is applied to the charging unit; and
executing a second rotating operation of rotating the image bearing member in a state in which the developing member is located at the second position and a third charging voltage smaller in absolute value than the second charging voltage is applied to the charging unit, wherein
the step of executing the first rotating operation and the step of executing the second rotating operation is performed after the step of executing the image forming operation.

A method of controlling an image forming apparatus according to the present invention includes the steps of:
forming an electrostatic latent image on an image bearing member charged by a charging unit;
moving a developing member, which is configured to form a developer image on a surface of the image bearing member by supplying thereto a developer containing toner and carriers and charged with a normal polarity at a developing position facing the image bearing member, between a first position where the developer is to be supplied to the surface of the image bearing member and a second position where the developer is not to be supplied to the surface of the image bearing member;
transferring the developer image to a transfer target;
creating between the developing member and the supply member a potential difference that causes an electrostatic force in a direction from the supply member to the developing member to act on the developer that is charged with the normal polarity, by performing at least one of application of a developing voltage to the developing member and application of a supply voltage to a supply member that supplies the developer to a surface of the developing member;
executing an image forming operation of forming an image on the transfer target in a state in which the developing member is located at the first position and a first potential difference is created between the developing member and the supply member;
executing a first rotating operation of rotating the image bearing member in a state in which the developing member is located at the first position and a second potential difference that is smaller than the first potential difference is created between the developing member and the supply member, and
executing a second rotating operation of rotating the image bearing member in a state in which the developing member is located at the second position, wherein
the step of executing the first rotating operation and the step of executing the second rotating operation is performed after the step of executing the image forming operation.

According to the present invention, in an image forming apparatus in which an electrostatic latent image formed on an image bearing member is developed using a developer containing toner and carriers, the charging unit for charging the image bearing member can be cleaned efficiently to remove the toner that has adhered to the charging unit.

Further features of the present invention will become apparent from the following description of exemplary embodiments with reference to the attached drawings.

DESCRIPTION OF THE EMBODIMENTS

Embodiment 1

Preferred embodiments of the present invention will be hereinafter illustratively described in detail with reference to the drawings. It should be noted that the sizes, materials, shapes, and relative arrangement or the like of constituent components described in the following embodiments should be altered suitably in accordance with the configuration and various conditions of an apparatus to which the present invention is applied. Accordingly, unless otherwise particularly specified, these specific features are not intended to limit the scope of the present invention to the following embodiments.

Figure 2:
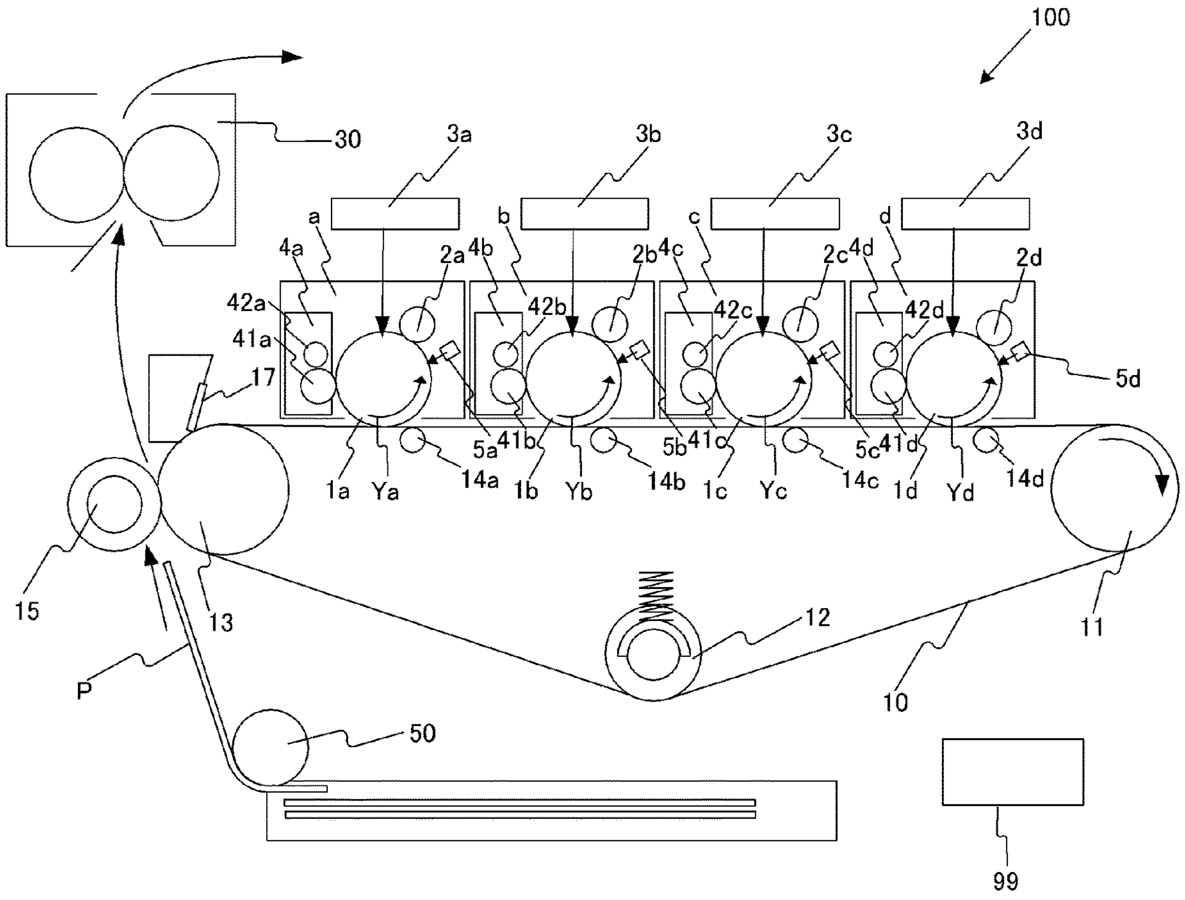
FIG. 2 is a schematic cross-sectional view of an image forming apparatus according to Embodiment 1.

FIG. 2 is a schematic diagram illustrating an example of an electrophotographic image forming apparatus according to Embodiment 1. The image forming apparatus 100 of Embodiment 1 is a tandem type image forming apparatus having image forming stations a to d. A first image forming station a, a second image forming station b, a third image forming station c, and a fourth image forming station d respectively form yellow (Y), magenta (M), cyan (C), and black (Bk) images. The image forming stations have the same configuration except for the color of toner they contain. Constituent elements common to the image forming stations are given the same reference numerals. Letters a, b, c, and d are added when distinguishing the colors of toner, and omitted when description is common to all stations irrespective of the toner color. Hereinafter, the configuration and operation of the image forming stations will be described, taking the first image forming station a as an example.

The first image forming station a includes a drum-shaped electrophotographic photosensitive member (hereinafter, photosensitive drum) 1 that is an image bearing member, a charging roller 2 that is a charging unit, an exposure unit 3, a development unit 4, and a pre-charge exposure unit 5. In the following description, the direction parallel to the rotation axis of the photosensitive drum 1, and the length along the rotation axis of the photosensitive drum 1, will be referred to as longitudinal direction and longitudinal width, respectively, which will also be applied to the description of various other constituent elements than the photosensitive drum 1.

The photosensitive drum 1 is an image bearing member that carries a toner image and is rotated at a peripheral velocity (process speed) of 150 mm/sec in the direction of arrow Y. The photosensitive drum 1 is made of a 20 mm diameter aluminum tube with a photosensitive layer and a surface layer provided thereon. The surface layer is a 20 μm thickness thin film layer of polycarbonate. A controller 99 starts the image forming operation of the image forming apparatus 100, i.e., starts rotating the photosensitive drum 1, when receiving an image signal. The rotating photosensitive drum 1 is charged uniformly to a predetermined potential with a predetermined polarity (negative in Embodiment 1) by the charging roller 2, and exposed by the exposure unit 3 based on the image signal. Thus an electrostatic latent image corresponding to a yellow component image of a color image based on the image signal is formed. This electrostatic latent image is then developed as a yellow toner image by the development unit (yellow development unit) 4.

The charging roller 2 makes contact with a surface of the photosensitive drum 1 with a predetermined pressure, and is driven to rotate relative to the photosensitive drum 1 by the friction between the charging roller 2 and the surface of the photosensitive drum 1 in a contact region (hereinafter referred to as charging section) therebetween. A predetermined DC voltage is applied to the rotation axis of the charging roller 2 from a charging bias power supply (not shown) in accordance with the image forming operation. In this embodiment, the charging roller 2 is made of a 5.5 mm diameter metal shaft with an elastic layer of a conductive elastic material having a thickness of 1.5 mm and volume resistivity of about $1\times10^6$ S2 cm. A DC voltage of −1300 V is applied to the rotation axis of the charging roller 2 as a charging bias in accordance with the image forming operation so as to charge the surface of the photosensitive drum 1 to the predetermined potential of −600 V. The surface potential of the photosensitive drum 1 was measured using an electrostatic voltmeter Model 344 made by Trek, Inc. The surface potential referred to here is the surface potential of the photosensitive drum 1 during the time when no image is formed, i.e., when no toner image is developed.

The exposure unit 3 is a unit that forms an electrostatic latent image on the photosensitive drum 1 charged by the charging roller 2. The exposure unit 3 includes a laser driver, laser diodes, polygon mirrors, optical lens system, and so on. The exposure unit 3 projects a laser beam to the photosensitive drum 1 to form an electrostatic latent image on the uniformly charged surface of the photosensitive drum 1 based on image data input to the image forming apparatus 100 from an external computer (not shown), for example. In this embodiment, the amount of exposure is adjusted such that the potential (image forming potential) V1 in the electrostatic latent image portion of the photosensitive drum 1 will be −100 V after being exposed by the exposure unit 3.

The development unit 4 is a unit that develops the electrostatic latent image to form a developer image, with a developer that contains a developer and carriers. The development unit 4 includes a developing roller 41 and the developer containing a non-magnetic mono-component toner (hereinafter, toner) and carriers. The developing roller 41 is a developing member that forms a developer image on the surface of the photosensitive drum 1 by supplying thereto a developer with a normal polarity containing toner and carriers at a developing position facing the photosensitive drum 1 that is the image bearing member. The developing roller 41 is able to move between a first position where the developer is supplied to the surface of the photosensitive drum 1, and a second position where the developer is not supplied to the surface of the photosensitive drum 1. In this embodiment, the first position is a position where the developing roller 41 contacts the photosensitive drum 1, and the second position is a position where the developing roller 41 is separated from the photosensitive drum 1.

The toner is a non-magnetic toner with negative chargeability produced by suspension polymerization and having a volume average particle size of 7.0 μm. When carried on the developing roller 41, the toner is negatively charged. The volume average particle size of the toner was measured using a laser diffraction particle size analyzer LS-230 made by Beckman Coulter, Inc.

The carriers are particles that intervene between the toner image developed on the photosensitive drum 1 and the photosensitive drum 1. The presence of the carriers reduces the adhesion between the toner image and the photosensitive drum 1 and helps improve the primary transfer efficiency of the toner image. The carriers in this embodiment are silica particles externally added to the toner. The carriers should preferably have a particle size of about 1000 nm or less so as to be less affected by the electrostatic force. The carriers in this embodiment have a particle size of 100 nm. The carriers externally added to the toner are transferred from the toner to the photosensitive drum 1 when the toner coated on the developing roller 41 makes contact with the photosensitive drum 1, irrespective of the potential difference between the developing roller 41 and the photosensitive drum 1.

The development unit 4 and the main body of the image forming apparatus 100 are equipped with a contact mechanism 94 (see FIG. 8) that controls the operation of the developing roller 41 moving from one to another of a state in which the developing roller 41 is located in the first position and the state in which the developing roller 41 is located in the second position. The contact mechanism 94 is controlled in accordance with the image forming operation and the like so that the developing roller 41 and photosensitive drum 1 are switched between the state in which they are in contact and the state in which they are separated from each other. When in contact with the photosensitive drum 1, the developing roller 41 exerts a pressure of 200 gf to the photosensitive drum 1. The contact region between the developing roller 41 and the photosensitive drum 1 (hereinafter, development nip) has a width in the rotating direction of the photosensitive drum 1 of 2 mm and a width in the longitudinal direction of the photosensitive drum 1 of 234 mm. The developing roller 41 is rotated in the same direction as the surface movement direction of the photosensitive drum 1 such that the surface movement speed (hereinafter, peripheral velocity) of the developing roller 41 is 140% of the peripheral velocity of the photosensitive drum 1 at the development nip.

The developing roller 41 is a roller made of a metal core and an elastic layer of urethan resin provided around the core. A DC voltage of −300 V is applied to the core of the developing roller 41 from a developing bias power supply (not shown) as a developing bias when the developing roller 41 comes to contact with the photosensitive drum 1 during the image forming operation. A potential difference between the developing bias of −300 V of the developing roller 41 and the image forming potential $V1=-100$ V in the electrostatic latent image portion of the photosensitive drum 1 generates an electrostatic force. This electrostatic force transfers the toner carried on the developing roller 41 to the electrostatic latent image portion of the photosensitive drum 1 during image formation, so that the electrostatic latent image is developed.

A supply roller 42 is a supply member that supplies the developer to the surface of the developing roller 41. The supply roller 42 is a sponge roller made of a metal core and a porous elastic layer formed around the core. The supply roller 42 is rotated in the opposite direction from the developing roller 41. In a section where the supply roller 42 and the developing roller 41 contact each other, the toner coated on the developing roller 41 is scraped off into a developer container, and new toner is supplied onto the developing roller 41. A predetermined DC voltage or a supply voltage (supply roller voltage Vrs) is applied to the supply roller 42 from a supply bias power supply 97 (see FIG. 8) that is a supply voltage application unit. A predetermined DC voltage or a developing voltage (developing roller voltage Vdc) is applied to the developing roller 41 from a developing bias power supply 93 (see FIG. 8) that is a developing voltage application unit. The controller 99 controls at least one of the supply bias power supply 97 and developing bias power supply 93 so that a potential difference that acts in a predetermined direction is created between the developing roller 41 and the supply roller 42. The potential difference that acts in a predetermined direction is a potential difference that generates an electrostatic force acting on the developer that is charged to the normal polarity, causing the developer to travel from the supply roller 42 toward the developing roller 41. The supply amount of toner is controlled by controlling the potential difference between the supply roller voltage Vrs and the developing voltage applied to the developing roller 41 (supply roller contrast $\Delta Vrs=Vrs-Vdc$).

The pre-charge exposure unit 5 exposes a portion of the photosensitive drum 1 that has passed through a primary transfer section before passing through the charging section, to eliminate non-uniformity in surface potential of the photosensitive drum 1 after the primary transfer.

An intermediate transfer belt 10 is passed over a plurality of tension members 11, 12, and 13 and rotated. The intermediate transfer belt 10 is driven to move in the same direction as the rotating direction of the photosensitive drum 1 at the contact region where the intermediate transfer belt 10 comes to contact with the photosensitive drum 1. A primary transfer roller 14 is a transfer unit that contacts the photosensitive drum 1 via the intermediate transfer belt 10 to transfer the developer image formed on the photosensitive drum 1 to the intermediate transfer belt 10 that is an intermediate transfer target (transfer-receiving member, transferred member). The region where the primary transfer roller 14 contacts the photosensitive drum 1 via the intermediate transfer belt 10 shall be hereinafter referred to as primary transfer section. At the time of primary transfer during the image forming operation, a DC voltage of 300 V is applied to the primary transfer roller 14 by a primary transfer power supply (not shown), whereby the toner image of the first color, yellow, formed on the photosensitive drum 1 is electrostatically transferred onto the intermediate transfer belt 10 when passing through the primary transfer section.

The primary transfer roller 14 is a cylindrical metal roller with a diameter of 6 mm made of nickel-plated SUS. The primary transfer roller 14 is offset 8 mm downstream in the moving direction of the intermediate transfer belt 10 relative to the center position of the photosensitive drum 1. This way, the intermediate transfer belt 10 makes contact with the photosensitive drum 1 in such a way that the intermediate transfer belt 10 wraps around the photosensitive drum 1. The primary transfer roller 14 is positioned 1 mm closer to the photosensitive drum 1 from the tangent plane on the photosensitive drum 1 on the most upstream tangent line in the moving direction of the intermediate transfer belt 10 between the photosensitive drum 1 and the intermediate transfer belt 10. For example, when the plane contacting both the tension member 13 and photosensitive drum 1 is a horizontal plane, the primary transfer roller 14 is offset 1 mm vertically upward from the point where the primary transfer roller 14 contacts the horizontal plane on the opposite side from the photosensitive drum 1. Thus the primary transfer roller 14 presses the intermediate transfer belt 10 with a force of about 200 gf, which ensures that the intermediate transfer belt 10 wraps around the photosensitive drum 1 over a certain length. The primary transfer roller 14 rotates, driven by the rotating (moving) intermediate transfer belt 10.

Similarly, toner images of the second color, magenta, third color, cyan, fourth color, black, are formed in the second, third, and fourth image forming stations b, c, and d, respectively, and transferred sequentially upon one another on the intermediate transfer belt 10. This way, an image corresponding to the image data is formed on the intermediate transfer belt 10 that is a transfer target (transfer-receiving member, transferred member).

A secondary transfer roller 15 as a secondary transfer target (transfer-receiving member, transferred member) contacts the intermediate transfer belt 10 with a pressure of 50 N, thereby forming a secondary transfer section (hereinafter, secondary transfer nip). The secondary transfer roller 15 is driven to rotate by the intermediate transfer belt 10. A paper feeder 50 feeds a recording material P to the secondary transfer nip, where the four-color toner image on the intermediate transfer belt 10 is collectively transferred onto the surface of the recording material P when passing through the secondary transfer nip (secondary transfer). A voltage of 1500 V is applied to the secondary transfer roller 15 by a secondary transfer power supply (not shown) at the time of secondary transfer of the toner on the intermediate transfer belt 10 onto the recording material P.

After that, the recording material P carrying the four-color toner image is introduced into a fixing unit 30, where the recording material P is heated and pressed so that the toners of four colors are melted and mixed, and fixed to the recording material P. Residual toner on the intermediate transfer belt 10 after the secondary transfer is cleaned off by a cleaning unit 17 and removed from the intermediate transfer belt 10.

The cleaning unit 17 has a cleaning blade or the like that makes contact with an outer circumferential surface of the intermediate transfer belt 10 to scrape off residual toner on the intermediate transfer belt 10 and recovers the toner back into the cleaning unit 17. The cleaning unit 17 collects the toner adhered on the intermediate transfer belt 10 downstream of the secondary transfer section in the rotating direction of the intermediate transfer belt 10.

A color image is formed on the recording material based on image data by the above image forming operation. While this embodiment has shown a configuration in which a toner image is first transferred from the photosensitive drum 1 to the intermediate transfer belt 10 and then transferred onto the recording material at the secondary transfer section, the image forming apparatus may be configured such that the toner image is transferred directly from the photosensitive drum 1 onto the recording material. The image forming operation will be described in more detail later.

Next, toner adhesion on the surface of the charging roller 2 and carrier adhesion on the photosensitive drum 1 in relation to this embodiment will be described.

First, toner adhesion on the surface of the charging roller 2 will be described. Residual toner on the photosensitive drum 1 contains charged toner having a normal charge polarity and the opposite polarity (positive in this embodiment) in a certain ratio, due to the influence of transfer at the primary transfer section during the image forming operation. Therefore, the positive toner in the residual toner transfers to the charging roller 2 as the photosensitive drum 1 rotates and the residual toner passes through the region where the photosensitive drum 1 contacts the charging roller 2, due to the electric field formed by a difference between the voltage applied to the charging roller 2 and the surface potential of the photosensitive drum 1. Such adhesion of residual toner on the surface of the charging roller 2 occurs every time the photosensitive drum 1 rotates and residual toner passes through the contact region between the photosensitive drum 1 and the charging roller 2. Accordingly, the residual toner accumulates on the surface of the charging roller 2 after repeated image forming operations and the like.

Figure 3A:
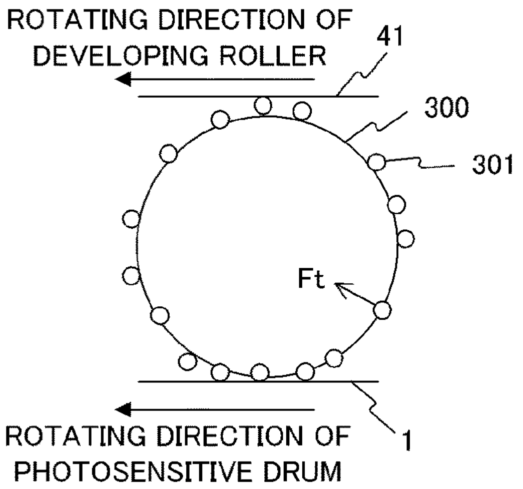
FIG. 3A and FIG. 3B are schematic views illustrating how carriers adhere to a photosensitive drum in Embodiment 1.
Figure 3B:
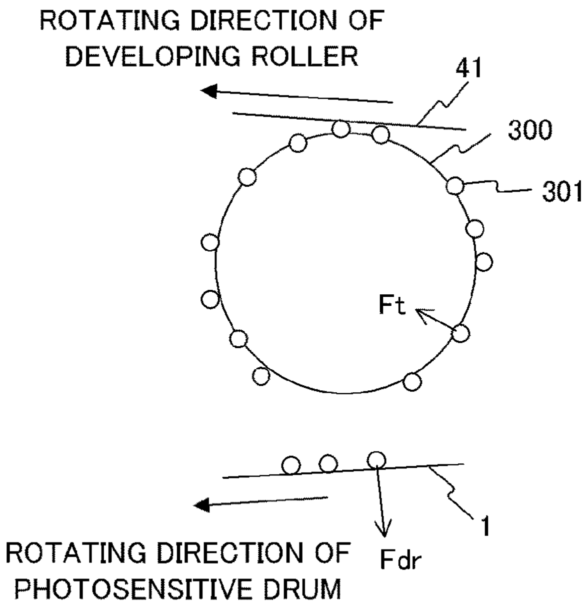

Next, carrier adhesion on the photosensitive drum 1 will be described. FIG. 3A is a schematic view of the development nip when the developing roller 41 is in contact with the photosensitive drum 1. As shown in FIG. 3A, the toner 300 carried on the developing roller 41 is in contact with the photosensitive drum 1 via the carriers 301 in the development nip, i.e., the carriers 301 intervene between the toner 300 and the photosensitive drum 1. FIG. 3B is a schematic view illustrating a state after the toner 300 carried on the developing roller 41 and the portion of the photosensitive drum 1 shown in FIG. 3A have passed through the development nip. The adhesion strength Ft between the carriers 301 and toner 300 at the development nip shown in FIG. 3A is lower than the adhesion strength Fdr between the carriers 301 and the photosensitive drum 1. Therefore, as shown in FIG. 3B, after passing through the development nip, some of the carriers 301 that were present between the toner 300 and the photosensitive drum 1 at the development nip have transferred from the toner 300 carried on the developing roller 41 to the photosensitive drum 1. Carriers 301 adhered on the toner 300 move to the photosensitive drum 1 also when the toner 300 is transferred to the photosensitive drum 1 in the image forming operation. Because of this, the amount of carriers 301 adhering in the image forming area on the photosensitive drum 1 becomes uneven depending on the contents of the image data for the image formation. Namely, more carriers 301 adhere in a region of pixels having a larger amount of toner transfer than in a region of pixels having a smaller amount of toner transfer or pixels with no toner transfer. Such an unevenness in the amount of carriers 301 adhering on the photosensitive drum 1 may inhibit uniform charging of the surface of the photosensitive drum 1.

The residual toner that accumulated on the charging roller 2 and uneven adhesion of carriers on the photosensitive drum 1 may sometimes lead to a density non-uniformity in the formed image.

To deal with this issue, the controller 99 executes the following control in this embodiment. Namely, the controller 99 is able to execute an image forming operation of forming an image on the intermediate transfer belt 10 that is a transfer target (transfer-receiving member, transferred member) in a state in which the developing roller 41 is located at a first position (contacting position) and a first charging voltage is applied to the charging roller 2. The controller 99 is able to execute a first rotating operation of rotating the photosensitive drum 1 in a state in which the developing roller 41 is located at the first position (contacting position) and a second charging voltage smaller in absolute value than the first charging voltage is applied to the charging roller 2. The controller 99 is able to execute a second rotating operation of rotating the photosensitive drum 1 in a state in which the developing roller 41 is located at a second position (separated position) and a third charging voltage smaller in absolute value than the second charging voltage is applied to the charging roller 2. Executing the first rotating operation enables execution of a supply operation of supplying carriers from the developing roller 41 to the surface of the photosensitive drum 1 as well as collection of excess carriers from the surface of the photosensitive drum 1. Thus carriers are controlled to be distributed evenly on the surface of the photosensitive drum 1. Executing the second rotating operation enables execution of a cleaning operation of cleaning the charging roller 2 by causing the developer to transfer from the charging roller 2 to the photosensitive drum 1. The controller 99 executes the first rotating operation and second rotating operation after the image forming operation.

In Embodiment 1, the second rotating operation is performed in the post-process rotation step that is a finishing step of the image forming operation after the primary transfer of the image. The first rotating operation is performed before the second rotating operation so that the charging roller 2 is efficiently cleaned during the second rotating operation for controlling the carriers to be distributed evenly on the photosensitive drum 1. In this embodiment, the first rotating operation and second rotating operation are both performed in this way after the image forming operation to the intermediate transfer belt 10. Alternatively, the first rotating operation and second rotating operation may be performed after executing the operation of forming the image on the recording material, or, the first rotating operation and second rotating operation may be started after the recording material has been discharged to the outside of the image forming apparatus 100. The first rotating operation will be described below in more detail.

Figure 1:
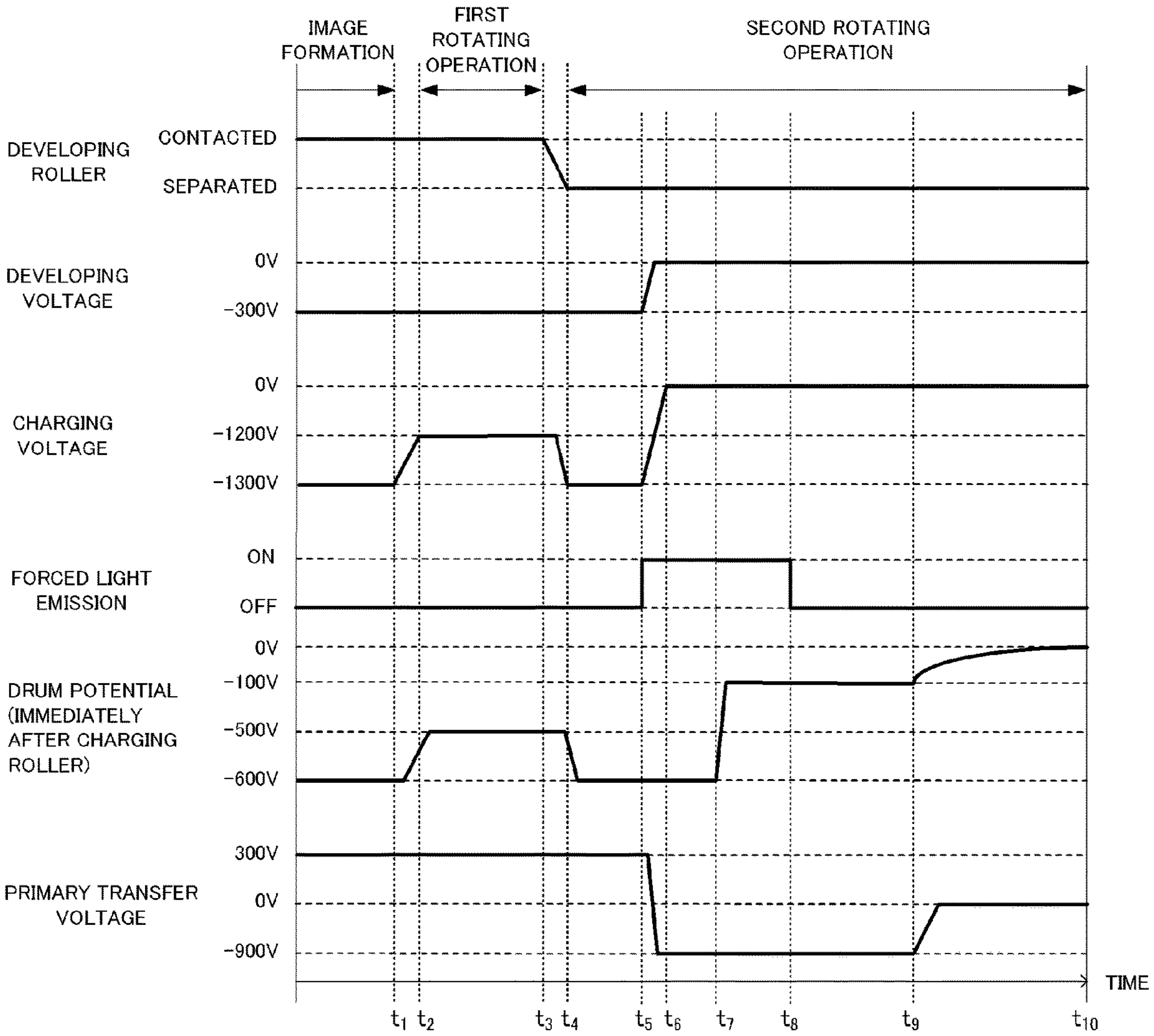
FIG. 1 is a timing chart of a first rotating operation and a second rotating operation in Embodiment 1.
Figure 8:
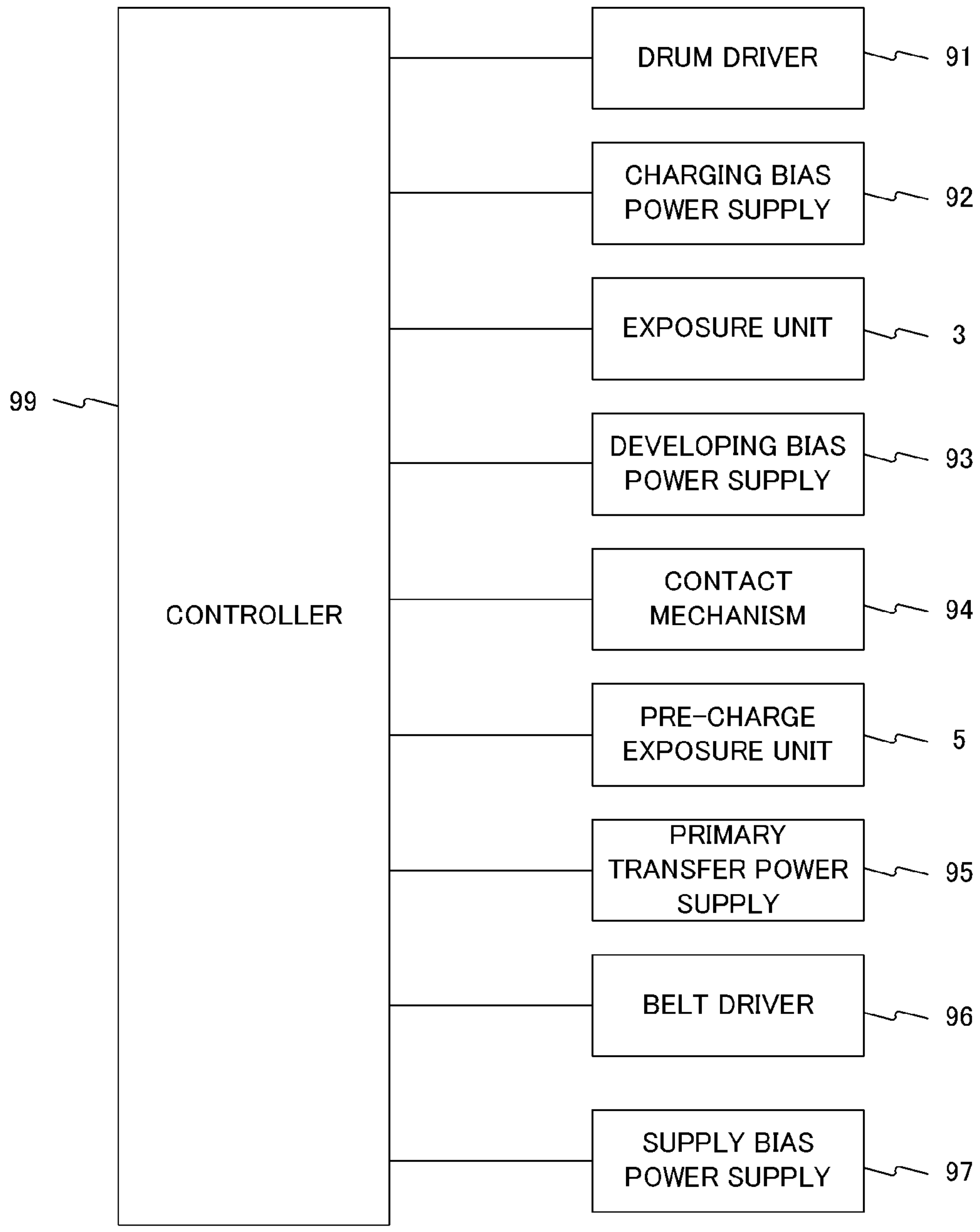
FIG. 8 is a block diagram illustrating the controller of the image forming apparatus according to Embodiment 1.

FIG. 1 shows a timing chart of an image forming operation, first rotating operation, and second rotating operation in this embodiment. As shown in FIG. 1, the first rotating operation is performed after the image forming operation, followed by the second rotating operation. These operations are executed by the controller 99 provided in the image forming apparatus 100. FIG. 8 is a block diagram illustrating the controller 99 and various constituent elements of the image forming apparatus 100 that are the control targets. The controller 99 controls a drum driver 91 to rotate the photosensitive drum 1, while controlling the charging bias power supply 92 that is the charging voltage application unit to apply a DC voltage that is a charging voltage to the charging roller 2, and controlling the exposure unit 3 to expose the photosensitive drum 1. The controller 99 also controls the developing bias power supply 93 that is the developing voltage application unit to apply a DC voltage that is a developing voltage to the development unit 4, while controlling the contact mechanism 94 to control the contact and separation of the developing roller 41 and the photosensitive drum 1. The controller 99 controls a pre-charge exposure unit 5 to expose the photosensitive drum 1 at a position upstream of the charging section, while controlling the primary transfer power supply 95 to apply a DC voltage to the primary transfer roller 14. The controller 99 controls a belt driver 96 to rotate the intermediate transfer belt 10, while controlling the supply bias power supply 97 that is the supply voltage application unit to apply a DC voltage that is a supply voltage to the supply roller 42. Some of the constituent elements shown in FIG. 8 are not shown in FIG. 1 to avoid complication of the drawing.

The first rotating operation will be described first. In this embodiment, the developing roller 41 has both functions of supplying carriers to the photosensitive drum 1 and of collecting carriers from the photosensitive drum 1. The first rotating operation involves driving of the developing roller 41 in contact with the photosensitive drum 1 in a state where there is a relationship between potentials such that the charged toner with the normal polarity does not transfer from the developing roller 41 to the photosensitive drum 1. There are surface-roughening particles on the surface of the developing roller 41, which form protruded portions that are higher than the average particle diameter of the toner. Therefore, even though coated with the toner, when the developing roller 41 is brought into contact with the photosensitive drum 1, these protruded portions make direct contact with the photosensitive drum 1. These protruded portions of the developing roller 41 where there is no toner collect carriers from regions abundant with carriers on the photosensitive drum 1. At the same time, portions of the developing roller 41 where toner is adhered supply carriers to regions short of carriers on the photosensitive drum 1. In this way, the developing roller 41 can make the carriers distribute evenly in one or two layers on the photosensitive drum 1.

Figure 4A:
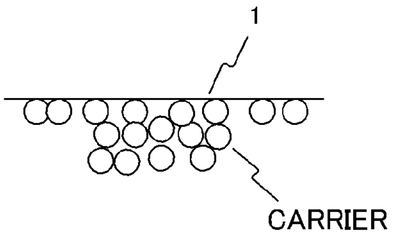
FIG. 4A and FIG. 4B are schematic views illustrating a state on the surface of the photosensitive drum with carriers adhered thereon in Embodiment 1.
Figure 4B:
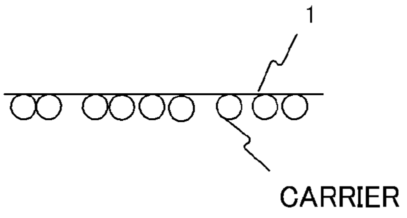

FIG. 4A is a schematic view illustrating unevenly distributed carriers on the photosensitive drum 1. The carrier distribution on the photosensitive drum 1 becomes uneven as shown in FIG. 4A when the same region on the photosensitive drum 1 has repeatedly corresponded to a region of an image with a large amount of toner transfer. FIG. 4B is a schematic view illustrating carriers on the photosensitive drum 1 after the first rotating operation has been performed. The first rotating operation can level off the unevenness of the carriers shown in FIG. 4A, to achieve a state where the carriers are deposited entirely in one or two layers on the photosensitive drum 1 as shown in FIG. 4B.

In this embodiment, during the execution of the first rotating operation, the charging roller 2 is controlled to reduce the discharge amount from the discharge amount during execution of the image forming operation. Specifically, as illustrated in FIG. 1, at time $t_1$ when the image forming operation ends, the voltage applied to the charging roller 2 is changed from the first charging voltage (−1300 V) during the image forming operation to a second charging voltage that is smaller in absolute value (−1200 V) than the first charging voltage. Reducing the absolute value of the charging voltage from the absolute value of the charging voltage during the execution of the image forming operation makes the potential difference between the charging roller 2 and the photosensitive drum 1 smaller, which reduces the charging current. This way, generation of discharge products such as nitrogen oxides can be reduced. Reducing discharge products can avoid compromising the transfer efficiency, since it prevents carriers from being embedded in substances containing discharge products on the photosensitive drum 1.

The first rotating operation is carried out from time $t_2$ to time $t_3$ in which the developing roller 41 is rotated in contact with the photosensitive drum 1. The execution time of the first rotating operation after the image formation (time during which the developing roller 41 stays in contact with the photosensitive drum 1) should be at least equal to or more than the time for the photosensitive drum 1 to make one turn, to achieve a favorable, even distribution of carriers on the photosensitive drum 1. The carriers on the photosensitive drum 1 are assumed to be distributed unevenly to a greater degree after repeated formation of similarly patterned images. In this case, therefore, the first rotating operation should preferably have an execution time corresponding to about five turns of the photosensitive drum 1. For an even greater degree of unevenness, the first rotating operation should preferably have an execution time corresponding to about ten turns of the photosensitive drum 1. In this embodiment, the execution time of the first rotating operation is set to correspond to twenty turns of the photosensitive drum 1 so that the carrier distribution can be made sufficiently uniform even after repeated formation of images in commonly formed patterns. This way, a balance is struck between the time required for the post-rotation step and the degree of carrier distribution evenness. To prevent carriers from being embedded in adhered substances containing discharge products, it is preferable to start the first rotating operation immediately after the end of the image forming operation. The number of rotations of the photosensitive drum 1 associated with the first rotating operation can be adjusted as required.

The second rotating operation will be described next. In the second rotating operation in this embodiment, the photosensitive drum 1 is rotated in a state in which a third charging voltage that is smaller in absolute value (0 V) than the second charging voltage (−1200 V) is applied to the charging roller 2. Moreover, electric fields are created between the photosensitive drum 1 and the charging roller 2, and between the photosensitive drum 1 and the primary transfer roller 14, in the opposite direction from that during execution of the image forming operation, to remove the positively charged toner from the charging roller 2.

Referring to FIG. 1, after the first rotating operation, the developing roller 41 is separated from the photosensitive drum 1 at time $t_3$. After the developing roller 41 has been completely separated at time $t_4$, the developing voltage is changed to 0 V at time $t_5$. While this embodiment shows an example in which the developing voltage is changed to 0 V after the developing roller 41 has been separated, the developing voltage is not limited to this example, as long as the developing voltage is changed after the developing roller 41 has been separated.

The charging voltage is changed from −1200 V to −1300 V at time $t_4$ after the first rotating operation, and the voltage (−1300 V) is kept applied for the time for the photosensitive drum 1 to make one turn (from time $t_4$ to time $t_5$). This makes the potential of the entire photosensitive drum 1 −600 V. Increasing the absolute value of the charging voltage can intensify the electric field toward the photosensitive drum 1.

Next, at time $t_5$, the charging voltage starts to change to the third charging voltage (0 V), and at the same time the exposure unit 3 performs forced light emission. The potential of the drum changes from −600 V to −100 V at the position exposed by the exposure unit 3. The forced exposure by the exposure unit 3 should preferably start at time $t_5$ so that exposure is finished no later than before the toner that has transferred first from the charging roller 2 to the photosensitive drum 1 reaches the exposure position by the rotation of the photosensitive drum 1. This way, the potential of the photosensitive drum 1 is changed to −100 V at the position where the toner that has transferred from the charging roller 2 is present.

The portion of the photosensitive drum 1 where the potential changed to −600 V, corresponding to the charging voltage of −1300 V applied to the charging roller 2 between time $t_4$ and time $t_5$, makes contact with the charging roller 2, to which the third charging voltage (0 V) is being applied, from time $t_6$ to time $t_7$. This creates an electric field between the 0 V charging roller 2 and the −600 V photosensitive drum 1 so that the positively charged toner on the charging roller 2 transfers to the photosensitive drum 1. In this embodiment, the difference between the second charging voltage (−1200 V) and the third charging voltage (0 V) is larger than the difference between the first charging voltage (−1300 V) and the second charging voltage (−1200 V). This is because of the necessity to create a potential difference that does not cause transfer of toner from the developing roller 41 to the photosensitive drum 1 during the first rotating operation, as well as for the purpose of causing the toner to actively transfer from the charging roller 2 to the photosensitive drum 1 during the second rotating operation.

The primary transfer voltage is changed from 300 V to −900 V before the toner that has transferred to the photosensitive drum 1 reaches the primary transfer section (immediately after time $t_5$ in FIG. 1). The potential of the photosensitive drum 1 at a position where the toner that has transferred from the charging roller 2 adheres is −100 V due to the forced light emission. This creates an electric field between the −100 V photosensitive drum 1 and the −900 V primary transfer roller 14 at the primary transfer section. This causes the positively charged toner on the photosensitive drum 1 to move to the intermediate transfer belt 10. While the primary transfer voltage is changed to −900 V here, the voltage may be set otherwise as long as it allows for transfer of positively charged toner. A voltage equivalent of the potential difference at the primary transfer section during the image formation may be applied.

The exposure unit 3 performs forced light emission for a predetermined time (from time $t_5$ to time $t_8$). In this embodiment, the predetermined time is set to a time corresponding to two turns of the photosensitive drum 1. This causes the positively charged toner on the photosensitive drum 1 to move to the intermediate transfer belt 10 more reliably. After that, at $t_9$, the primary transfer voltage is changed from −900 V to 0 V. The positively charged toner that has transferred to the intermediate transfer belt 10 is then transported through the secondary transfer section to a section opposite the cleaning unit 17 by the circulating movement of the intermediate transfer belt 10, and collected by the cleaning unit 17 at time $t_{10}$. The execution time of the second rotating operation from time $t_4$ to time $t_{10}$ here is set to a time corresponding to forty turns of the photosensitive drum 1. In this embodiment, the second rotating operation has a longer execution time than the first rotating operation. The second rotating operation involves transfer of toner from the charging roller 2 to the photosensitive drum 1 and then to the intermediate transfer belt 10, until eventually the toner is removed from the intermediate transfer belt 10 by the cleaning unit 17. Therefore, securing a longer time for the second rotating operation can ensure reliable cleaning of the charging roller 2. The number of rotations of the photosensitive drum 1 associated with the second rotating operation can be adjusted as required. The execution time of the second rotating operation may be shorter than the execution time of the first rotating operation.

With the first rotating operation and second rotating operation controlled as described above, toner adhering on the surface of the charging roller 2 can be removed efficiently.

Next, the advantageous effects of this embodiment will be described. In this embodiment, the first rotating operation is performed before the second rotating operation, which enables cleaning of the charging roller 2 without carriers being distributed unevenly on the photosensitive drum 1. Therefore, the second rotating operation can be performed in a state in which the potential of the photosensitive drum 1 opposite the charging roller 2 is controlled to be uniform in advance. This enables control for causing the toner to transfer uniformly from the charging roller 2 to the photosensitive drum 1 during the second rotating operation. For the purpose of confirming the advantageous effects of this embodiment, the amount of carriers adhered on the photosensitive drum 1 after carrying out the first rotating operation, and the amount of toner on the charging roller 2 after carrying out the second rotating operation were examined.

To determine the amount of carriers adhered on the photosensitive drum 1, the image forming operation was performed five times in succession, in which an image of a vertical line of 25 mm width in the longitudinal direction was formed in a central portion of the photosensitive drum 1. The apparatus was stopped for observation at time $t_3$ immediately after the first rotating operation. The observation method involved acquisition of images of a printing portion and a non-printing portion on the surface of the photosensitive drum 1 with the use of a laser microscope (VK-X200 made by Keyence Corporation) at 3000 times magnification. The acquired images showed that there was hardly any difference in the amount of carriers between the printing portion and the non-printing portion of the photosensitive drum 1, indicating that the carriers distributed uniformly on the photosensitive drum 1.

To determine the amount of toner adhered on the charging roller 2, the image forming operation was performed five times in succession, in which an image of a vertical line of 25 mm width in the longitudinal direction was formed in a central portion of the photosensitive drum 1. The toner density on the charging roller 2 immediately after the first rotating operation and second rotating operation was measured. Specifically, the toner on the charging roller 2 was collected using a transparent tape (polyester tape 5511 made by Nichiban Co., Ltd.), and the tape was then stuck on high white paper (GFC081 made by Canon Inc.). The densities D1 and D2 of the toner on the transparent tapes taken respectively from a printing portion and a non-printing portion were then measured using a reflectometer (Model TC-6DS made by Tokyo Denshoku Co., Ltd.). The difference in toner density between the printing portion and the non-printing portion on the charging roller 2, calculated as an absolute value |D2−D1| of the difference, was 5% or less, which indicated that the toner was uniformly cleaned off of the charging roller 2.

As described above, the first rotating operation collects excess carriers from the photosensitive drum 1 by the developing roller 41, as well as supplies carriers to a region of the photosensitive drum 1 short of carriers. This way, carriers are controlled to adhere uniformly on the photosensitive drum 1, to reduce non-uniformity in the surface potential of the photosensitive drum 1. This first rotating operation is performed before the second rotating operation so that the second rotating operation is performed with the surface potential of the photosensitive drum 1 being uniform, which causes the toner to transfer evenly from the charging roller 2 to the photosensitive drum 1. Thus the toner on the charging roller 2 can be reduced evenly.

Figure 5:
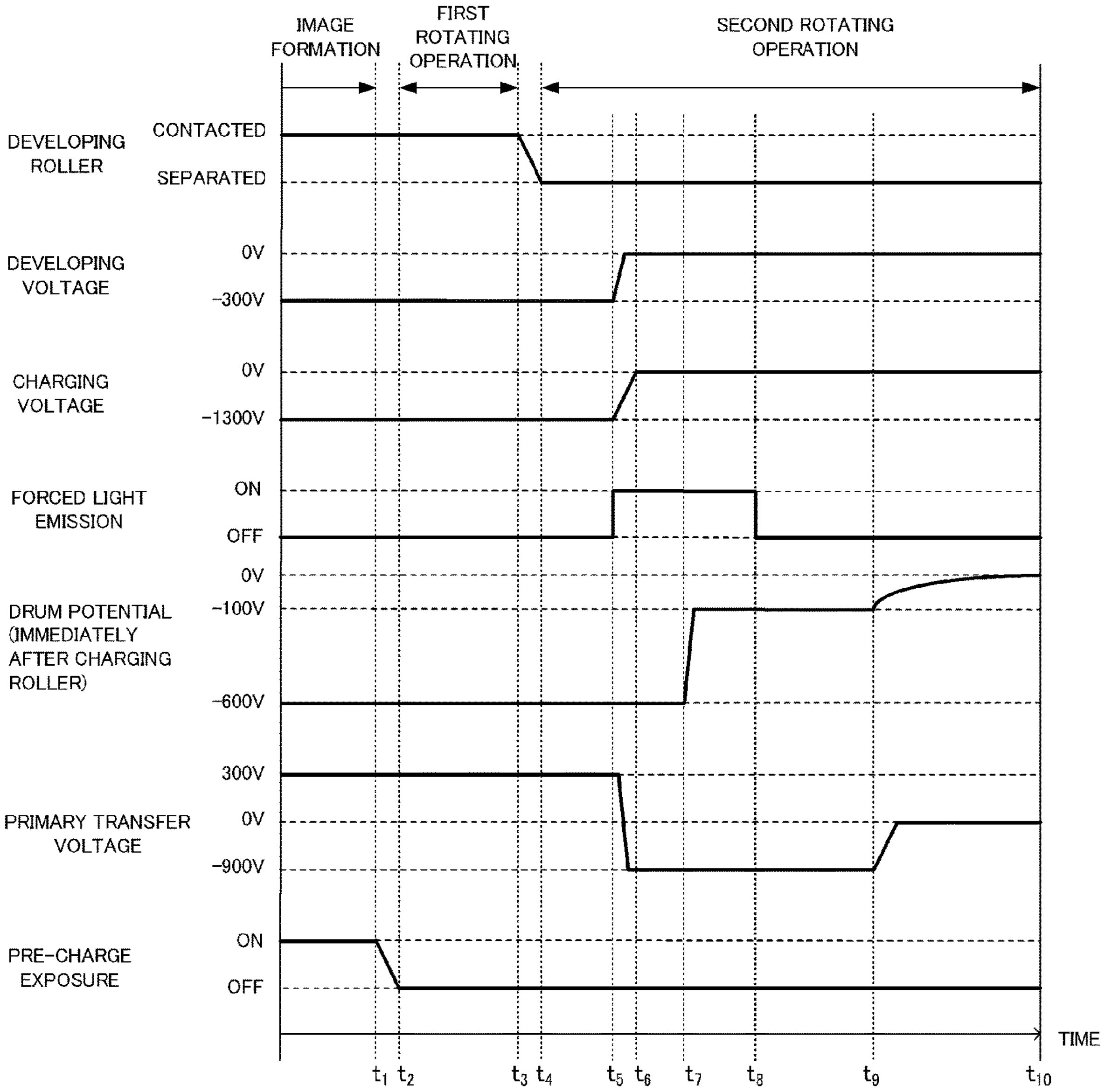
FIG. 5 is a timing chart of a first rotating operation and a second rotating operation in a variation example of Embodiment 1.

In this embodiment, as one example of control for preventing generation of discharge products, the absolute value of the charging voltage is reduced during the first rotating operation. Other control schemes that can prevent generation of discharge products may be adopted. For example, the exposure intensity of the pre-charge exposure unit 5 may be reduced during the execution of the first rotating operation from the exposure intensity during the execution of the image forming operation. For example, as illustrated in FIG. 5, the pre-charge exposure by the pre-charge exposure unit 5 may be turned off at time $t_2$. This reduces the potential difference between the photosensitive drum 1 and the charging roller 2 immediately before the charging section, which helps reduce discharge products. The first rotating operation is carried out with the developing roller 41 in contact with the photosensitive drum 1 until time $t_3$. The control steps from time $t_0$ to time $t_1$, and from time $t_3$ onwards are similar to those described with reference to FIG. 1. During the first rotating operation, instead of reducing the charging voltage, the developing roller 41 may be rotated in contact with the photosensitive drum 1. In this case, too, carriers can be controlled to be present uniformly on the photosensitive drum 1.

The toner transfers from the charging roller 2 to the photosensitive drum 1 with the carriers during the second rotating operation, so that a region on the photosensitive drum 1 where toner has transferred from the charging roller 2 and adhered has more carriers than other regions. When the carrier distribution on the photosensitive drum 1 becomes uneven because of this, the charge may become uneven in the following image forming operation, and the unevenness in the charge may lead to an image density non-uniformity.

Figure 6:
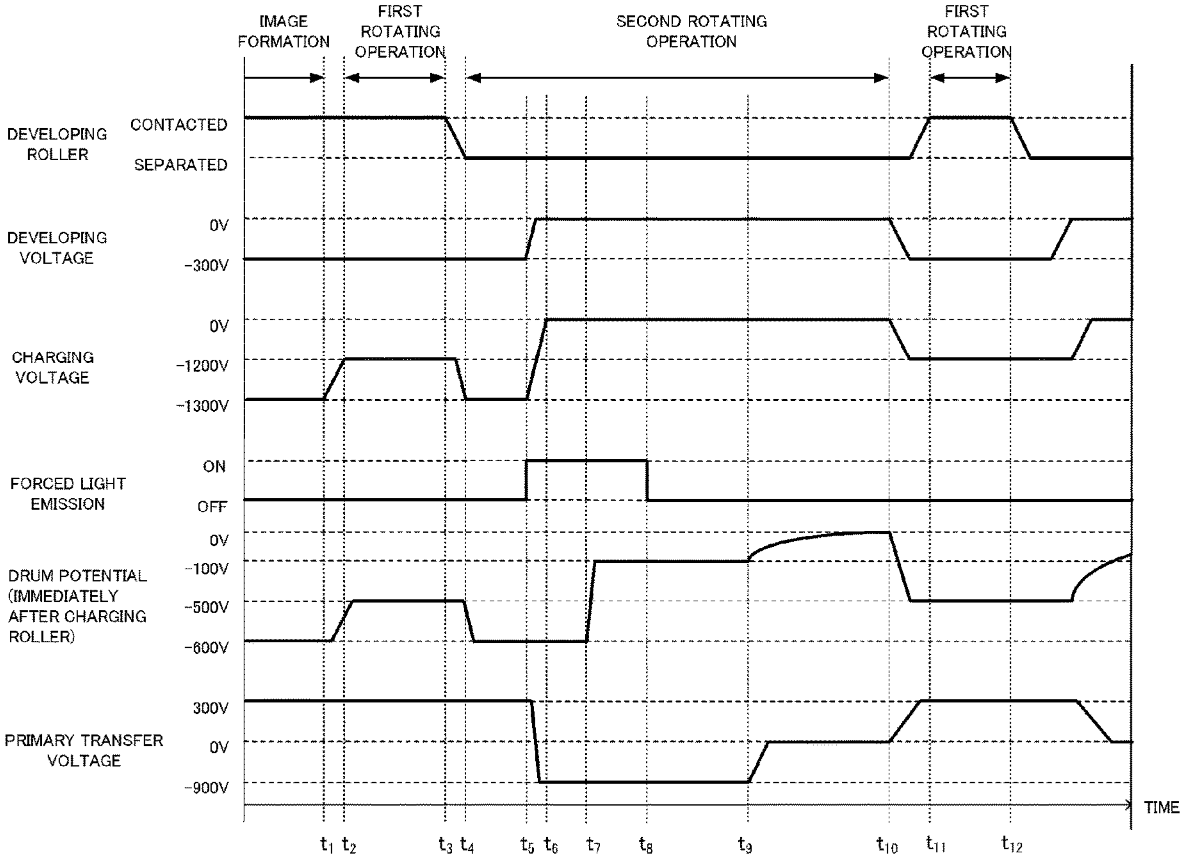
FIG. 6 is a timing chart of a first rotating operation and a second rotating operation in a variation example of Embodiment 1.

To avoid this, the first rotating operation may be performed again after the second rotating operation as shown in FIG. 6. At time $t_{10}$ in FIG. 6 when the second rotating operation has ended, the developing roller 41 is brought into contact with the photosensitive drum 1 again, and the first rotating operation is performed from time $t_{11}$ to time $t_{12}$. This way, the next image formation is performed in a condition in which the carriers on the photosensitive drum 1 are controlled to be even more uniform, so that the image formation can be performed favorably.

While the first rotating operation and second rotating operation are performed in the post rotation step after the image forming operation in the example described in this embodiment, the control scheme is not limited to this. The timing for performing the first rotating operation and second rotating operation may be determined between one image formation and another in accordance with the contents of the image data for the image formation. For example, the first rotating operation and second rotating operation may be performed every time a series of image forming sessions has ended, or, the first rotating operation and second rotating operation may be performed every time image formation has been done on a predetermined number of sheets. This predetermined number of sheets may be a fixed number, or may be variable in accordance with the contents of image data for the image formation, or depending on ambient conditions such as temperature and humidity. The time required for performing the first rotating operation may be varied in accordance with the contents of image data for the image formation, or depending on ambient conditions such as temperature and humidity.

Embodiment 2

A second embodiment will be described. The components of the image forming apparatus 100 according to this embodiment that are common to Embodiment 1 are given the same reference numerals and a detailed description thereof will be omitted. In this embodiment, the controller 99 is able to execute an image forming operation of forming an image on the intermediate transfer belt 10 that is a transfer target (transfer-receiving member, transferred member) in a state in which the developing roller 41 is located at the first position (contacting position) and there is a first potential created difference between the developing roller 41 and the supply roller 42. The controller 99 is able to execute a first rotating operation of rotating the photosensitive drum 1 in a state in which the developing roller 41 is located at a first position (contacting position) and there is a second potential difference that is smaller than the first potential difference created between the developing roller 41 and the supply roller 42. The controller 99 is able to execute a second rotating operation of rotating the photosensitive drum 1 in a state in which the developing roller 41 is located at a second position (separated position). Executing the first rotating operation enables execution of a supply operation of supplying carriers from the developing roller 41 to the surface of the photosensitive drum 1 as well as collection of excess carriers from the surface of the photosensitive drum 1. Thus carriers are controlled to be present uniformly on the surface of the photosensitive drum 1. Executing the second rotating operation enables execution of a cleaning operation of cleaning the charging roller 2 by causing the developer to transfer from the charging roller 2 to the photosensitive drum 1. The controller 99 executes the first rotating operation and second rotating operation after the image forming operation.

In the first rotating operation, the developing roller 41 of the development unit 4 carries less developer than during the image forming operation. In this embodiment, during execution of the first rotating operation, the absolute value of voltage applied to the supply roller 42 is reduced from that of the voltage during execution of the image forming operation, so as to make the potential difference (second potential difference) between the supply roller 42 and the developing roller 41 smaller than the first potential difference during the image forming operation. The potential difference between the supply roller 42 and the developing roller 41 is referred to as supply roller contrast ΔVrs (Vrs−Vdc). To reduce the amount of discharge products on the photosensitive drum 1, the absolute value of primary transfer voltage is reduced from that of the voltage during execution of the image forming operation, during or after the first rotating operation. Reducing the absolute value of primary transfer voltage makes the potential difference between the photosensitive drum 1 and the primary transfer roller 14 at the primary transfer section smaller, which reduces the variation in potential of the photosensitive drum 1 before and after the primary transfer section. This makes the potential difference between the charging roller 2 and the photosensitive drum 1 at the charging section after passing through the primary transfer section smaller and reduces the charging current, which helps reduce discharge products.

Figure 7:
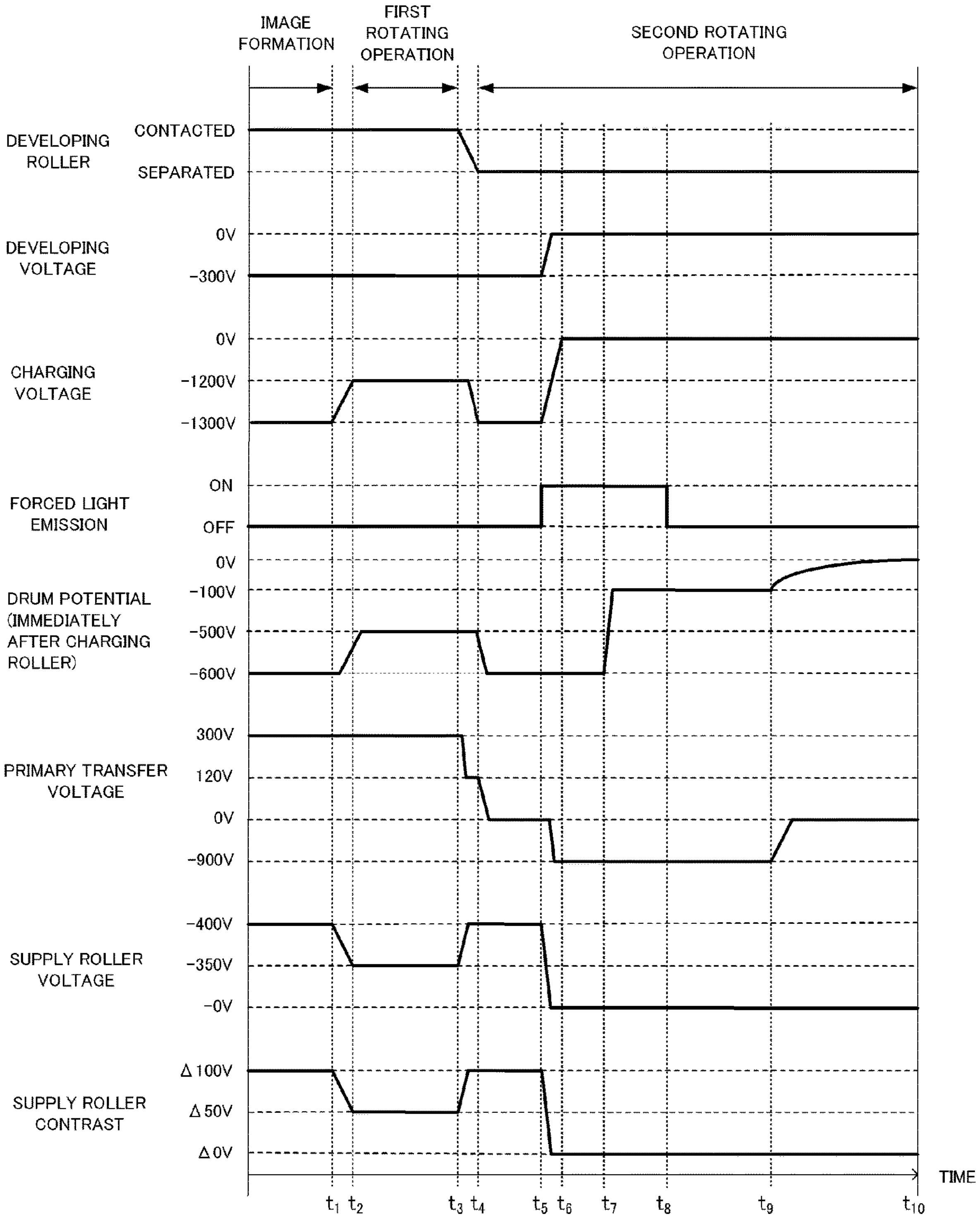
FIG. 7 is a timing chart of a first rotating operation and a second rotating operation in Embodiment 2.

As illustrated in FIG. 7, at time $t_1$ after the image formation, the supply roller voltage is changed from −400 V to −350 V. The supply roller contrast ΔVrs, which was Δ100 V during the image forming operation, then decreases to Δ50 V. Namely, the controller 99 controls the potential difference between the developing roller 41 and the supply roller 42 to be Δ100 V that is the first potential difference during the image forming operation, and Δ50 V that is the second potential difference smaller than the first potential difference during the first rotating operation. After that, during the first rotating operation from time $t_2$ to time $t_3$, the supply roller contrast ΔVrs is kept at Δ50 V. Making the supply roller contrast ΔVrs smaller reduces the electric field for causing the negative toner to move from the supply roller 42 toward the developing roller 41, and thus can reduce the amount of toner on the developing roller 41. As there are more regions where toner is not adhered on the developing roller 41, the area of the portions where the surface of the developing roller 41 is exposed, in the surface of the developing roller 41 contacting the photosensitive drum 1, is increased. This enables efficient collection of excess carriers adhered on the photosensitive drum 1. The carrier distribution on the photosensitive drum 1 made uniform efficiently this way enables reduction of the execution time of the first rotating operation. In Embodiment 2, the execution time of the first rotating operation is set to a time corresponding to eighteen turns of the photosensitive drum 1, which is shorter than that of Embodiment 1. In the example described in this embodiment, the potential difference (supply roller contrast ΔVrs) between the developing roller 41 and the supply roller 42, which is Δ100 V during the image forming operation, is reduced to Δ50 V during the first rotating operation. The control scheme is not limited to this example. The supply roller contrast ΔVrs may for example be changed to Δ0 V, or to a negative value. With a negative ΔVrs value, the potential difference (second potential difference) between the developing roller 41 and the supply roller 42 during the first rotating operation will have the opposite polarity from that of the first potential difference during the image forming operation. Controlling the supply roller contrast during the first rotating operation in this manner can help reduce the toner supply to the developing roller 41 during the first rotating operation.

After the first rotating operation, the developing roller 41 is separated at time $t_4$. A supply roller voltage of −400 V, which is the same as the voltage during image formation, is applied during the period in which the developing voltage of −300 V is applied. This allows the amount of toner on the developing roller 41 to increase back to the same amount of developer when executing the image forming operation, so that the next image formation can be performed favorably. The supply roller voltage is reduced to 0 V so that the supply roller contrast will be Δ0 V in accordance with the change of the developing voltage from −300 V to 0 V at time $t_5$.

The primary transfer voltage is changed stepwise from 300 V to 120 V, then to 0 V, at a timing after the rear end of the recording material to which image formation was performed until time $t_1$ has passed through the secondary transfer section. FIG. 7 shows an example in which these changes are made to the primary transfer voltage after time $t_3$. Instead, the changes may be made to the primary transfer voltage during the execution of the first rotating operation before time $t_3$.

Control operations after $t_5$ onwards are the same as those of Embodiment 1.

According to this embodiment, the supply roller contrast ΔVrs is made smaller during the first rotating operation to reduce the amount of toner transferring from the supply roller 42 to the developing roller 41. This increases the area of the portions where the surface of the developing roller 41 is exposed, in the surface of the developing roller 41 contacting the photosensitive drum 1, which allows for efficient collection of excess carriers adhered on the photosensitive drum 1. The carrier distribution on the photosensitive drum 1 is thus made uniform reliably, allowing more uniform cleaning of the charging roller 2 by the second rotating operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-077158, filed on Apr. 30, 2021, which is hereby incorporated by reference herein in its entirety.

What is claimed is:

1. An image forming apparatus comprising:

a photosensitive drum;

a charging roller configured to charge the photosensitive drum;

a laser light source configured to expose the photosensitive drum charged by the charging roller to form an electrostatic latent image;

a developing roller configured to form a developer image on a surface of the photosensitive drum by supplying thereto a developer containing toner and particles that assist transfer at a developing position facing the photosensitive drum, the developing roller being configured to move between a first position, which is where the developing roller contacts the photosensitive drum to supply the developer to the surface of the photosensitive drum, and a second position, which is where the developing roller is separated from the photosensitive drum so that the developer is not supplied to the surface of the photosensitive drum;

a transfer roller configured to transfer the developer image to a transfer target;

a charging voltage power supply configured to apply charging voltages including a first charging voltage, a second charging voltage that is lower, in an absolute value, than the first charging voltage, and a third charging voltage that is lower, in an absolute value, than the second charging voltage, to the charging roller; and a controller controlling that controls the charging voltage power supply and configured to execute:

an image forming operation of forming an image on the transfer target in a state where the developing roller is located at the first position and the first charging voltage is applied;

a first rotating operation of rotating the photosensitive drum in a state where the developing roller is located at the first position and the second charging voltage is applied;

a second rotating operation of rotating the photosensitive drum in a state where the developing roller is located at the second position and the third charging voltage is applied; and so that the first rotating operation and the second rotating operation are performed after the image forming operation.

2. The image forming apparatus according to claim 1, wherein a difference between the second charging voltage and the third charging voltage is larger than a difference between the first charging voltage and the second charging voltage.

3. The image forming apparatus according to claim 1, further comprising:

a supply roller configured to supply the developer to a surface of the developing roller;

a developing voltage power supply configured to apply a developing voltage to the developing roller; and a supply voltage power supply configured to apply a supply voltage to the supply roller, wherein the controller is configured to further execute:

control of at least one of the developing voltage power supply or the supply voltage power supply to create a potential difference that causes an electrostatic force in a direction from the supply roller to the developing roller to act on the developer that is charged with a normal polarity; and control of forming an image on the transfer target in a state where a first potential difference is created between the developing roller and the supply roller during the image forming operation, and wherein the photosensitive drum is configured to be rotated in a state where a second potential difference, which that is smaller than the first potential difference, is created between the developing roller and the supply roller during the first rotating operation.

4. The image forming apparatus according to claim 3, wherein the controller is configured to control the second potential difference to be zero or a value with opposite polarity from that of the first potential difference in the first rotating operation.

5. The image forming apparatus according to claim 1, wherein the transfer target is an intermediate transfer target.

6. The image forming apparatus according to claim 1, wherein the controller is configured to execute:

a supply operation of supplying the particles that assist transfer from the developing roller to a surface of the photosensitive drum by executing the first rotating operation; and a cleaning operation of cleaning the charging roller by causing the developer to move from the charging roller to the photosensitive drum by executing the second rotating operation.

7. The image forming apparatus according to claim 1, wherein the second rotating operation has a longer execution time than the first rotating operation.

8. The image forming apparatus according to claim 1, wherein, during the second rotating operation, the controller creates an electric field having an opposite direction from that during the image forming operation between the photosensitive drum and the charging roller and between the photosensitive drum and the transfer roller.

9. The image forming apparatus according to claim 1, wherein the controller executes the second rotating operation after the first rotating operation.

10. The image forming apparatus according to claim 9, wherein the controller executes the first rotating operation again after the second rotating operation.

11. The image forming apparatus according to claim 1, wherein the controller executes the first rotating operation immediately after the image forming operation.

12. The image forming apparatus according to claim 1, further comprising:

a pre-charge laser light source configured to expose a portion of the photosensitive drum that has passed through the transfer roller but has not yet passed through the charging roller, wherein the controller controls exposure intensity of the pre-charge laser light source to be smaller during the first rotating operation than during the image forming operation.

13. The image forming apparatus according to claim 1, wherein the controller controls an absolute value of a transfer voltage in the transfer roller to be smaller during or after the first rotating operation than during the image forming operation.

14. The image forming apparatus according to claim 1, wherein the controller executes the first rotating operation during a period for the photosensitive drum to make at least one turn.

15. The image forming apparatus according to claim 1, wherein the controller controls an amount of developer carried on the developing roller to be smaller during the first rotating operation than during the image forming operation.

16. The image forming apparatus according to claim 15, wherein the controller controls an absolute value of a supply voltage applied to a supply roller that supplies toner to the developing roller to be smaller during the first rotating operation than during the image forming operation.

17. The image forming apparatus according to claim 15, wherein the controller controls an amount of developer carried on the developing roller back to be the same amount after the first rotating operation as during the image forming operation.

18. The image forming apparatus according to claim 1, wherein the controller causes the laser light source to expose the photosensitive drum for a predetermined time during the second rotating operation.

19. A method of controlling an image forming apparatus comprising the steps of:

forming an electrostatic latent image on a photosensitive drum charged by a charging roller;

moving a developing roller, which is configured to form a developer image on a surface of the photosensitive drum by supplying thereto a developer containing toner and particles that assist transfer at a developing position facing the photosensitive drum, between a first position, which is where the developing roller contacts the photosensitive drum to supply the developer to the surface of the photosensitive drum, and a second position, which is where the developing roller is separated from the photosensitive drum so that the developer is not to be supplied to the surface of the photosensitive drum;

transferring the developer image to a transfer target;

executing an image forming operation of forming an image on the transfer target in a state where the developing roller is located at the first position and a first charging voltage is applied to the charging unit roller;

executing a first rotating operation of rotating the photosensitive drum in a state where the developing roller is located at the first position and a second charging voltage, which is smaller in absolute value than the first charging voltage, is applied to the charging roller; and executing a second rotating operation of rotating the photosensitive drum in a state where the developing roller is located at the second position and a third charging voltage, which is smaller in absolute value than the second charging voltage, is applied to the charging roller, wherein the step of executing the first rotating operation and the step of executing the second rotating operation is performed after the step of executing the image forming operation.

* * * * *